United States Patent
ter Braak (10) Patent No.: US 7,478,967 B2
(45) Date of Patent: Jan. 20, 2009

(54) SAFETY CONNECTION INTENDED FOR SUSPENDING OBJECTS, FOR INSTANCE RAILS, RODS, TOWEL RACKS AND THE LIKE AS WELL AS A CURTAIN RAIL SYSTEM AND CONNECTING DEVICE

(75) Inventor: Bart ter Braak, Doorn (NL)

(73) Assignee: Rold Edward Goelst, Ad Ede (NL)

( * ) Notice: Subject to any disclaimer, the term of this patent is extended or adjusted under 35 U.S.C. 154(b) by 0 days.

(21) Appl. No.: 10/620,550

(22) Filed: Jul. 16, 2003

(65) Prior Publication Data

US 2004/0126181 A1   Jul. 1, 2004

(30) Foreign Application Priority Data

Jul. 18, 2002   (EP)   .................................. 02077955

(51) Int. Cl.
*A47F 5/08*   (2006.01)
(52) U.S. Cl. ........................... 403/2; 403/275; 403/280; 403/329; 211/94.01; 248/317; 248/340; 160/196.1; 160/345
(58) Field of Classification Search .................. 403/2, 403/41, 275, 277, 280, 282, 329; 24/602; 16/202; 211/94.01, 105.4; 248/317, 323, 248/327, 340; 160/196.1, 199, 345
See application file for complete search history.

(56) References Cited

U.S. PATENT DOCUMENTS

| | | | | |
|---|---|---|---|---|
| 3,540,089 A | * | 11/1970 | Franklin | 24/602 |
| 3,916,477 A | * | 11/1975 | Baker, Sr. | 16/94 D |
| 4,733,625 A | * | 3/1988 | Allen | 403/289 |
| 5,485,875 A | * | 1/1996 | Genova | 160/168.1 R |
| 5,518,056 A | * | 5/1996 | Voss | 24/115 F |
| 5,542,461 A | * | 8/1996 | Huang | 24/602 |
| 5,634,244 A | * | 6/1997 | Fetsch et al. | 24/115 F |
| 5,765,260 A | * | 6/1998 | Judkins | 160/345 |
| 5,791,382 A | * | 8/1998 | Froment et al. | 403/329 |
| 5,957,612 A | | 9/1999 | Bradley | |
| 6,182,739 B1 | * | 2/2001 | Jones | 160/345 |

\* cited by examiner

*Primary Examiner*—Michael P Ferguson
(74) *Attorney, Agent, or Firm*—Merchant & Gould P.C.

(57) ABSTRACT

A safety connection intended for suspending objects, for instance curtain rails, rods, towel racks and the like, the safety connection (2) comprising at least one first (3) and one second (4) retaining element, the one retaining element (3; 4), after mounting, being coupled to the object to be suspended, while the other retaining element (4; 3), after mounting, is connected to an environment, the first (3) and second (4) retaining element being detachably coupled to each other such that, under the influence of a particular tensile force (F) applied to those elements (3, 4), these retaining elements (3, 4) disconnect, characterized in that the second retaining element (4) is provided with at least one resilient lip (5), while the first and second retaining elements (3, 4) are arranged to cooperate via that at least one resilient lip (5) for effecting said detachable coupling of the retaining elements (3, 4).

18 Claims, 9 Drawing Sheets

SAFETY CONNECTION INTENDED FOR SUSPENDING OBJECTS, FOR INSTANCE RAILS, RODS, TOWEL RACKS AND THE LIKE AS WELL AS A CURTAIN RAIL SYSTEM AND CONNECTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

FIELD OF THE INVENTION

The invention relates to a safety connection intended for suspending objects, for instance curtain rails, rods, towel racks and the like, the safety connection comprising at least one first and one second retaining element, the one retaining element, after mounting, being coupled to the object to be suspended, while the other retaining member, after mounting, is connected to an environment, the first and second retaining element being detachably coupled to each other such that under the influence of a particular tensile force applied to those elements, these retaining elements disconnect.

BACKGROUND OF THE INVENTION

Such a safety connection is known from U.S. Pat. No. 5,957,612. In this patent, a curtain rail is described which is suspended from, for instance, a ceiling via a number of safety connections. With a normal load on each safety connection, at least a load resulting from the weight of the suspended rail and a curtain suspended therefrom, the curtain rail is retained by the safety connections and coupled to the ceiling. However, when the safety connections are loaded abnormally, for instance when a person tries to end his life by hanging himself from the rail, the safety connections disconnect from the rail. As a result, the rail can be prevented from being used as an auxiliary means in suicide. A curtain rail system provided with such safety connection is, for instance, used in hospitals or psychiatric institutions.

Each safety connection known from the referred-to US patent comprises a lower and an upper outside tube, the lower tube being provided at an extremity with a plug extending in a tube socket of the upper tube. The tube socket and plug are detachably coupled to each other by a ring, provided between them in a channel of one of the elements, which ring is manufactured from elastic material such as, for instance, rubber. This elastic ring ensures that the tube socket and the plug disconnect under the influence of a tensile force equal to or greater than a particular threshold load. With a normal load which is below the threshold load mentioned, the tube socket and the plug are held together by the ring.

A disadvantage of the known safety connection is that the value of the threshold load mentioned is variable within a relatively large range of forces. As a result, it is uncertain whether the connection will actually disconnect at an abnormal loading of the safety connection. Variation of the threshold load can, firstly, be caused in that the elastic rings, over time, loose elasticity. Additionally, a part of an elastic ring can become jammed between the first and the second retaining element when these retaining elements and the ring are coupled to or uncoupled from each other, which hampers or even completely prevents uncoupling of the safety connection. Moreover, through such jamming, the elastic ring can be damaged.

Further, the known safety connection is particularly disadvantageous with respect to the relatively great diameter of the elastic ring mentioned. This great diameter is necessary, so that the ring can apply sufficiently great forces to the socket and the plug for holding the socket and plug together at normal load. Due to this necessarily great ring diameter, the safety connection can only be provided with an outer tube having a relatively great diameter, which is undesired from an aesthetic viewpoint.

Further, it is difficult to properly arrange each elastic ring in the channel of one of the retaining elements designed for reception of that ring, because the channel is not easily accessible from an environment. Additionally, the known safety connection consists of relatively many parts, which renders this connection relatively expensive.

Another disadvantage of the known safety connection is that the lower tube of each safety connection comes down with the rail after disconnection of the safety connections.

BRIEF SUMMARY OF THE INVENTION

The present invention contemplates eliminating the disadvantages of the known safety connection. In particular, the invention contemplates a safety connection or load release system which is relatively reliable, and which connection can preferably be of a relatively slender design.

To this end, the safety connection according to the invention is characterized in that the second retaining element is provided with at least one resilient lip, while the first and second retaining elements are arranged to cooperate via that at least one resilient lip for effecting the above detachable coupling of the retaining elements.

Over time, the resilient lip can maintain its inherent resilient action, so that the cooperation of that lip and the first retaining element can proceed, each time, in substantially the same manner. Moreover, the risk of the two retaining elements becoming jammed to each other during coupling or uncoupling is very small due to the use of one or more resilient lips. Consequently, this safety connection is relatively reliable. For instance, the resilient lip can be manufactured from a plastic.

Preferably, after mounting, the at least one resilient lip extends on average in a direction which includes an angle with a vertical plane in the range of approximately 10-45°. As a result, the safety connection provided with that resilient lip can be of relatively slim design, so that this connection can, for instance, be received in a pendant tube with a small diameter.

According to a very advantageous elaboration of the invention, the at least one resilient lip is an integral part of the second retaining element.

As a result, the safety connection can be composed with very few parts, in particular with only two, i.e. the first and the second retaining element. Consequently, the safety connection can be of particularly simple and inexpensive design. Further, the risk of defects with a safety connection provided with few parts is relatively small, which increases the reliability of this connection. Moreover, the safety connection requires relatively little maintenance. As a result, the costs of maintenance of this system are low. The second retaining element and the at least one resilient lip, for instance, can be easily injection-moulded together from a plastic.

The invention further provides a curtain rail system provided with at least one safety connection. This system utilizes the above-mentioned advantages of the safety connection provided by the invention. The safety connection can be easily disposed in a connecting device, for instance in a pendant tube for suspending a curtain rail from a wall or ceiling. Moreover, the connecting device can be of relatively slender design when using the safety connection according to the invention.

BRIEF DESCRIPTION OF THE SEVERAL VIEWS OF THE DRAWINGS

Further elaborations of the invention are provided by the subclaims. The invention will now be elucidated with reference to two exemplary embodiments and the drawing. In the drawing:

DETAILED DESCRIPTION OF THE INVENTION

FIGS. 1-6 show a curtain rail 1 of a rail system. The rail 1 is provided with a lower rail section part 101 having a lower rail groove 102 (see FIG. 3). In this lower rail section part 101, curtain runners (not represented) known from practice can be received for suspending a curtain from the rail 1.

Figure 3:
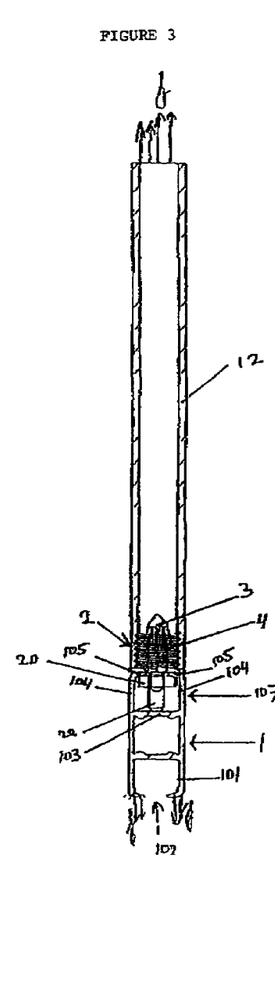
FIG. 3 shows a cross sectional view along line III-III of the side view represented in FIG. 2.

As shown in FIG. 3, the rail 1 comprises an upper rail section part 107, provided with a horizontal dividing wall 103 with two side walls 104 extending at right angles thereto. Upper edges 105 of the side walls 104 are flanged such, that these edges 105 reach towards each other to some extent. These upper edges 105 bound a top rail groove 106 via which an inside space of the upper rail section part 107 is accessible.

Figure 1:
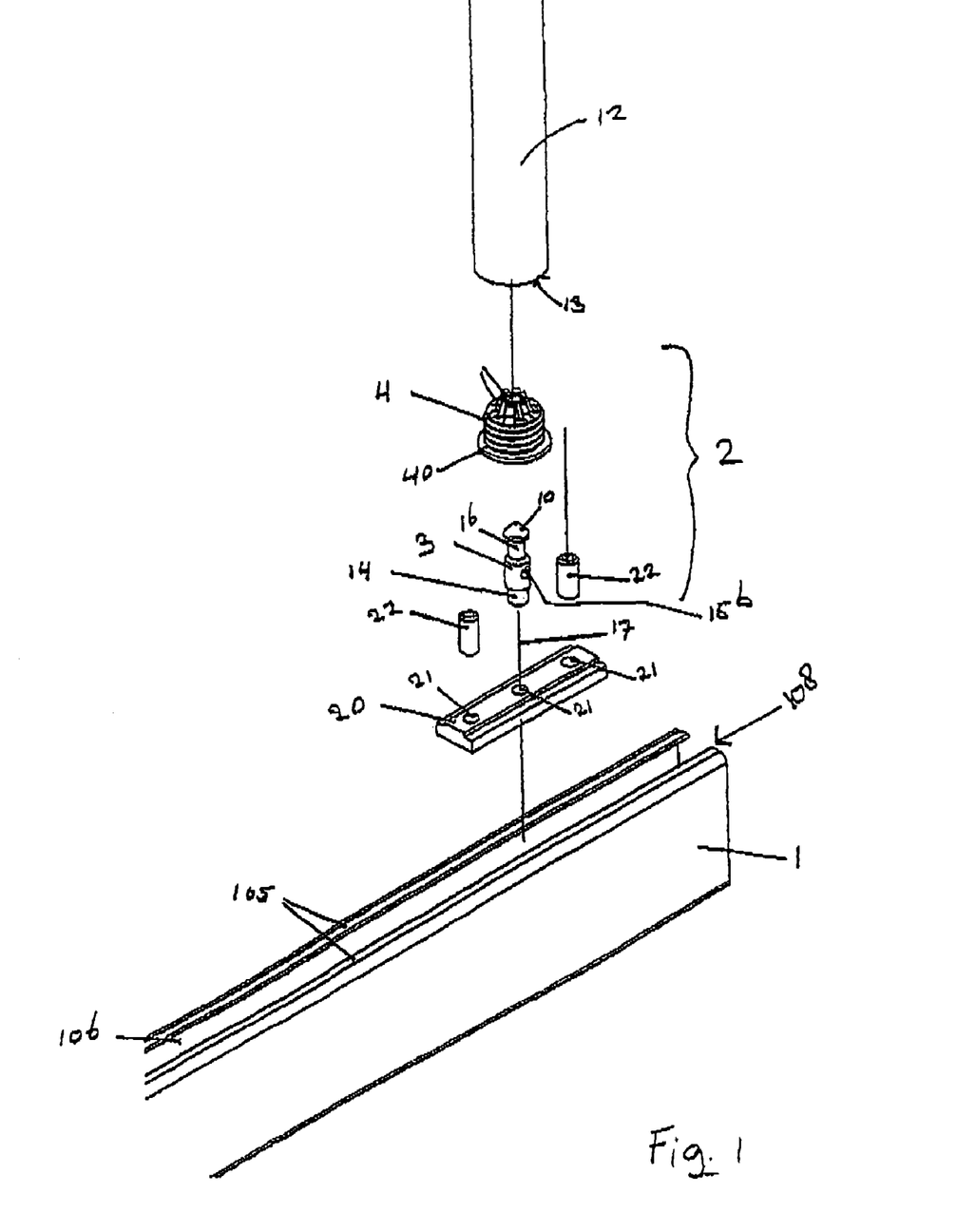
FIG. 1 shows an exploded view, represented in perspective, of a first exemplary embodiment of the invention.
Figure 2:
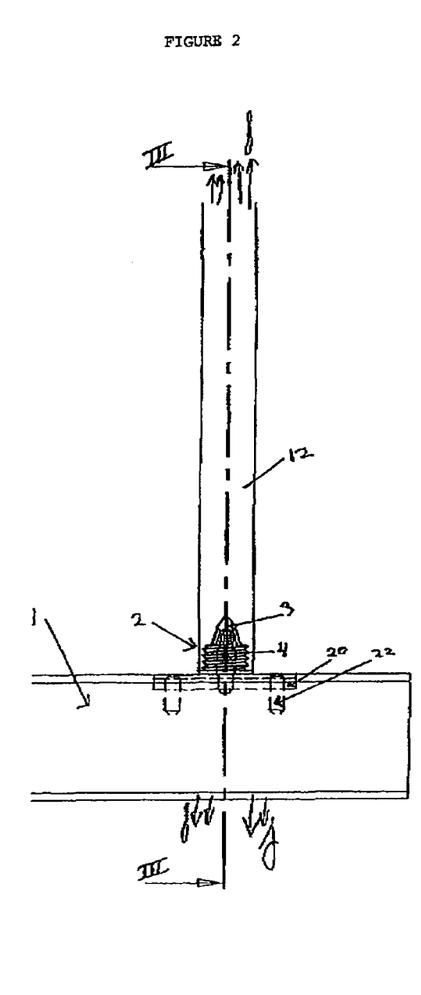
FIG. 2 shows a partly cut-away side view of the exemplary embodiment represented in FIG. 1.

The rail 1 is provided with a disconnectable safety connection 2. This safety connection 2 comprises a first retaining element 3 and a second retaining element 4. The first retaining element 3 is designed as a retaining pin 3 which is coupled to the rail 1 via a coupling plate 20 provided in the upper rail section part 107. This coupling plate 20 extends along the upper edges 105 in the inside space of the upper rail section part 107. The coupling plate 20 is provided with two spacing pins 22 projecting from passages 21 of that plate 20. By these pins 22 the coupling plate 20 is supported on the partition wall 103 of the rail 1 for maintaining the plate 20 in a desired position in the rail 1. The coupling plate 20 and the spacing pins 22 can be easily fitted at a desired position in the rail 1 via the upper rail groove 106 and/or via an open front rail end 108. By a lower body 14, the retaining pin 3 is fitted into a third passage 21 of the coupling plate 20. From that passage 21, the retaining pin 3 then extends upwardly along the upper rail groove 106.

The second retaining element 4 comprises a plug, fitted in a tube or pendant 12. To this end, the plug 4 is provided with screw thread, with which the plug 4 is screwed into a lower end of the tube 12 provided with internal screw thread. A bottom end of the plug 4 is provided with an annular flange 40 which, after mounting, extends between a lower edge 13 of the tube 12 and an upper side of the rail 1. The flange 40 prevents the plug 4 from being screwed into the tube 12 too deeply during mounting. Moreover, the flange 40 can prevent damage to the rail 1 resulting from contact with a sharp tube edge 13. Preferably, the dimensions of the plug 4 are such that this plug 4 can be fitted into a tube 12 having an inside diameter of less than 2 cm. More in particular, the tube 12 has a diameter in the range of 1-1.5 cm. As a result, a visually attractive, slender and relatively light suspension system for the rail 1 can be provided.

Figure 5:
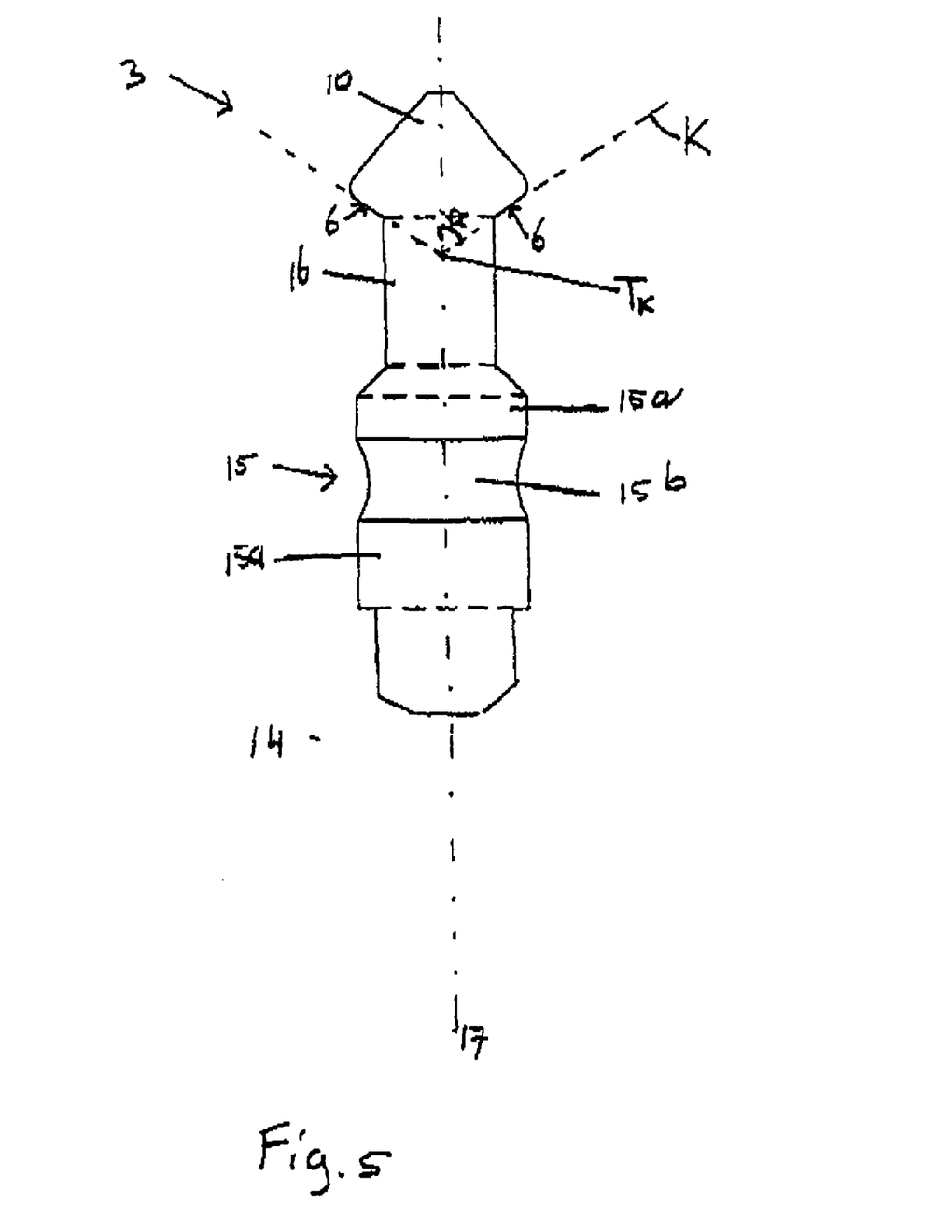
FIG. 5 shows a side view of the first retaining element of the exemplary embodiment represented in FIG. 1.

As shown in FIG. 5, the retaining pin 3 is designed to be rotation-symmetrical about a longitudinal central axis 17. Viewed in FIG. 5 from bottom to top, the pin 3 is provided with a substantially cylindrical lower body 14, a widened middle part 15, a cylindrical, reduced part 16 and a widened but upwardly tapering head 10. The pin middle part 15 is provided with a bore 15b with the aid of which the pin can be engaged for securing the pin. A lower side of the widened head 10 of the pin 3 extends from the reduced pin part 16 obliquely upwards and forms a slide-off surface 6. In particular, the slide-off surface 6 extends along a concentric conical plane K, whose top $T_K$ lies on the central axis 17 in the reduced pen part 16. The half apex angle α of this conical surface K lies, for instance, in the range of 45-75°, in particular in the range of 60-70°.

Figure 6:
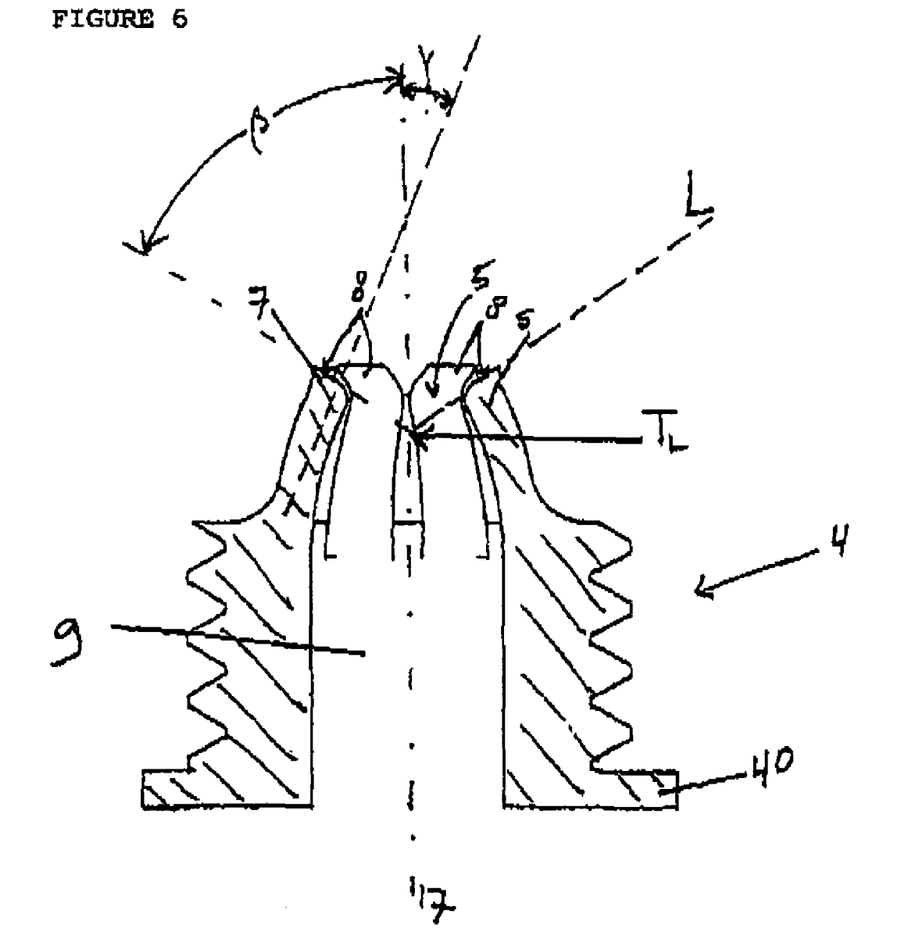
FIG. 6 shows a longitudinal cross section of the second retaining element of the exemplary embodiment represented in FIG. 1.

Like the pin 3, the plug 4 is of rotation-symmetrical design with respect to the longitudinal central axis 17. As shown in FIG. 6, the plug 4 comprises an axial passage 9. Adjacent a top end represented in the Figure, the plug 4 is provided with integral resilient lips 5, reaching slightly obliquely towards each other in upward direction. The resilient lips 5 each extend, on average, in a direction including an angle γ with a vertical plane in the range of approximately 10-45°, in the present exemplary embodiment, in particular, in the range of approximately 15-30°. With the resilient lips 5 in unloaded condition, the diameter of the passage 9 of the plug 4 is constricted by the facing sides of front ends 7 of the resilient lips 5. The front lip ends 7 of the lips 5 each comprise a sliding surface 8. These sliding surfaces 8 touch a concentric conical surface L, whose top $T_L$ lies on the longitudinal central axis 17 in the space partly enclosed by the lips 5. The half apex angle β of this conical plane L is substantially equal to the half apex angle α of the conical plane K mentioned, in which the slide-off surface 6 of the pin 3 extends.

Figure 4:
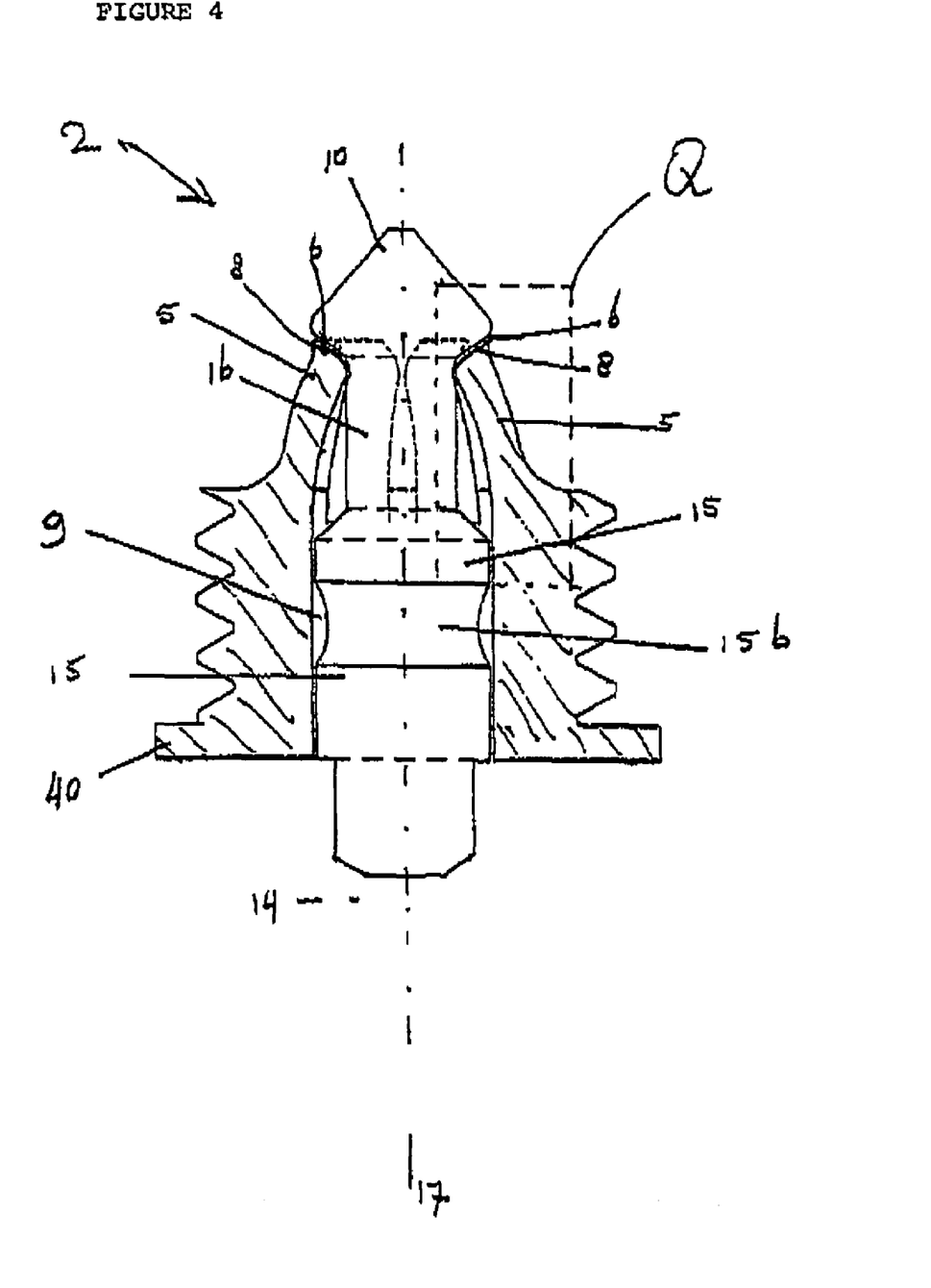
FIG. 4 shows a cut-away side view of a first and a second retaining element of the exemplary embodiment represented in FIG. 1.

FIG. 4 shows the retaining pin 3 and the plug 4 in a detachably coupled condition. A part 14, 15, 16 of the pin 3 then extends through the plug passage 9. With the respective lip sliding surfaces 8, the resilient lips 5 of the plug 4 abut against the slide-off surface 6 of the pin 3. As shown in the Figure, the plug sliding surfaces 8 are substantially parallel to the slide-off surface 6 of the widened pin head 10. Moreover, a width of each lip sliding surface 8 is substantially equal to a width of the slide-off surface 6 of the pin head 10.

Figure 7:
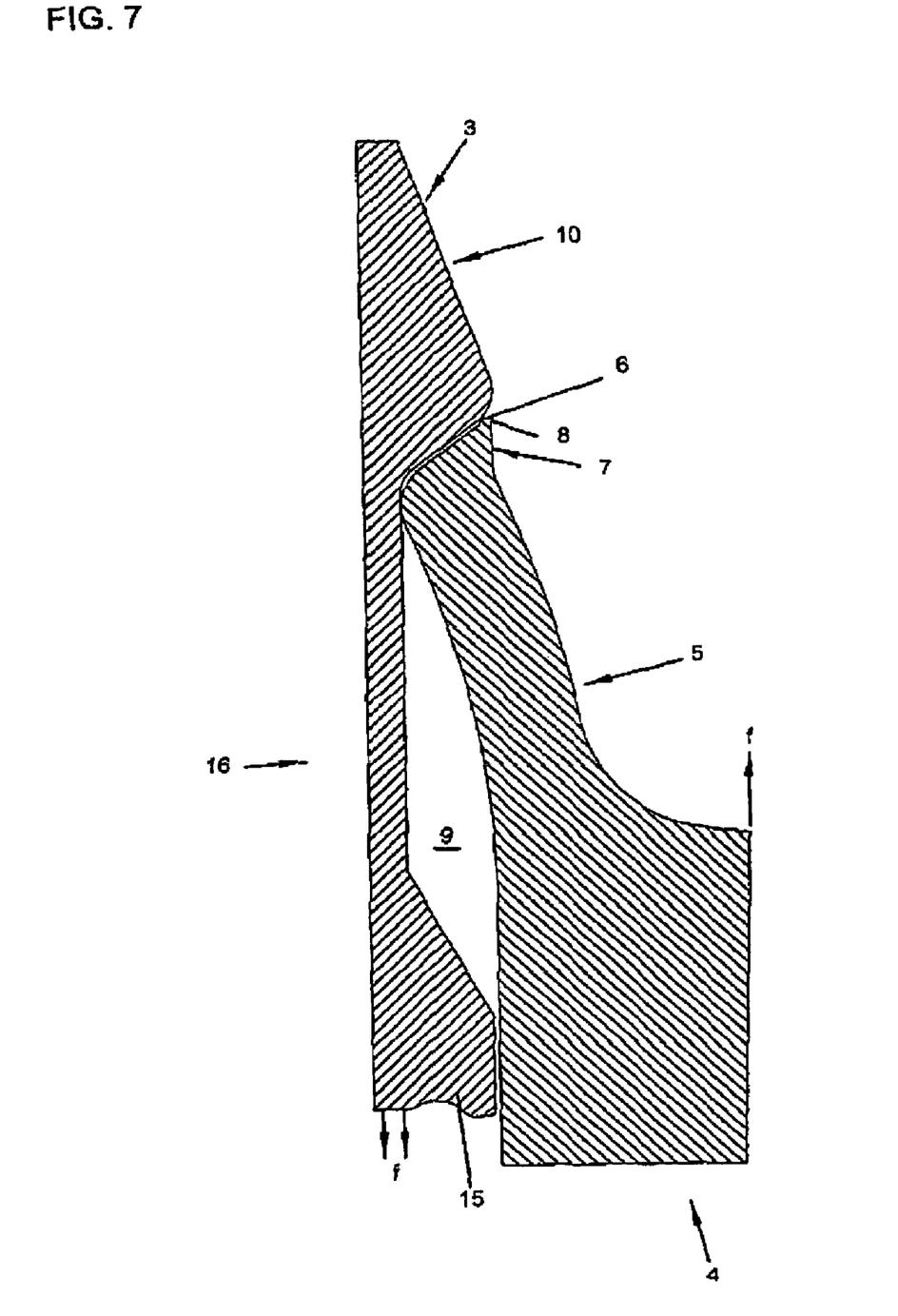
FIG. 7 shows detail Q of the side view represented in FIG. 4, while a regular tensile load f is applied to the first and second retaining elements.

FIG. 7 shows, in detail, the position of the widened head 10 of the pin 3 and of a resilient lip 5 of the plug 4, when substantially vertical tensile forces f are applied thereto as a result of a normal load on the rail. These tensile forces f are also drawn in in FIGS. 2 and 3. In explanation of FIG. 7, the pin 3 and the plug 4 are represented in a somewhat exploded view, so that a slit is visible between the sliding surfaces 6, 8 of these parts 3, 4. In reality, the pin 3 and the plug 4 abut against each other with the respective sliding surfaces 6, 8. Under the influence of this normal load f, each resilient lip 5 is substantially undeformed with respect to a completely unloaded condition represented in FIG. 6, so that the resilient lips 5 constrict the plug passage 9. In this position, the resilient lips 5 prevent the pin 3 from sliding from the plug passage 9 in downward direction, so that the rail 1 is coupled to the pendant 12 by the assembly of the plug 4 and the pin 3.

Figure 8:
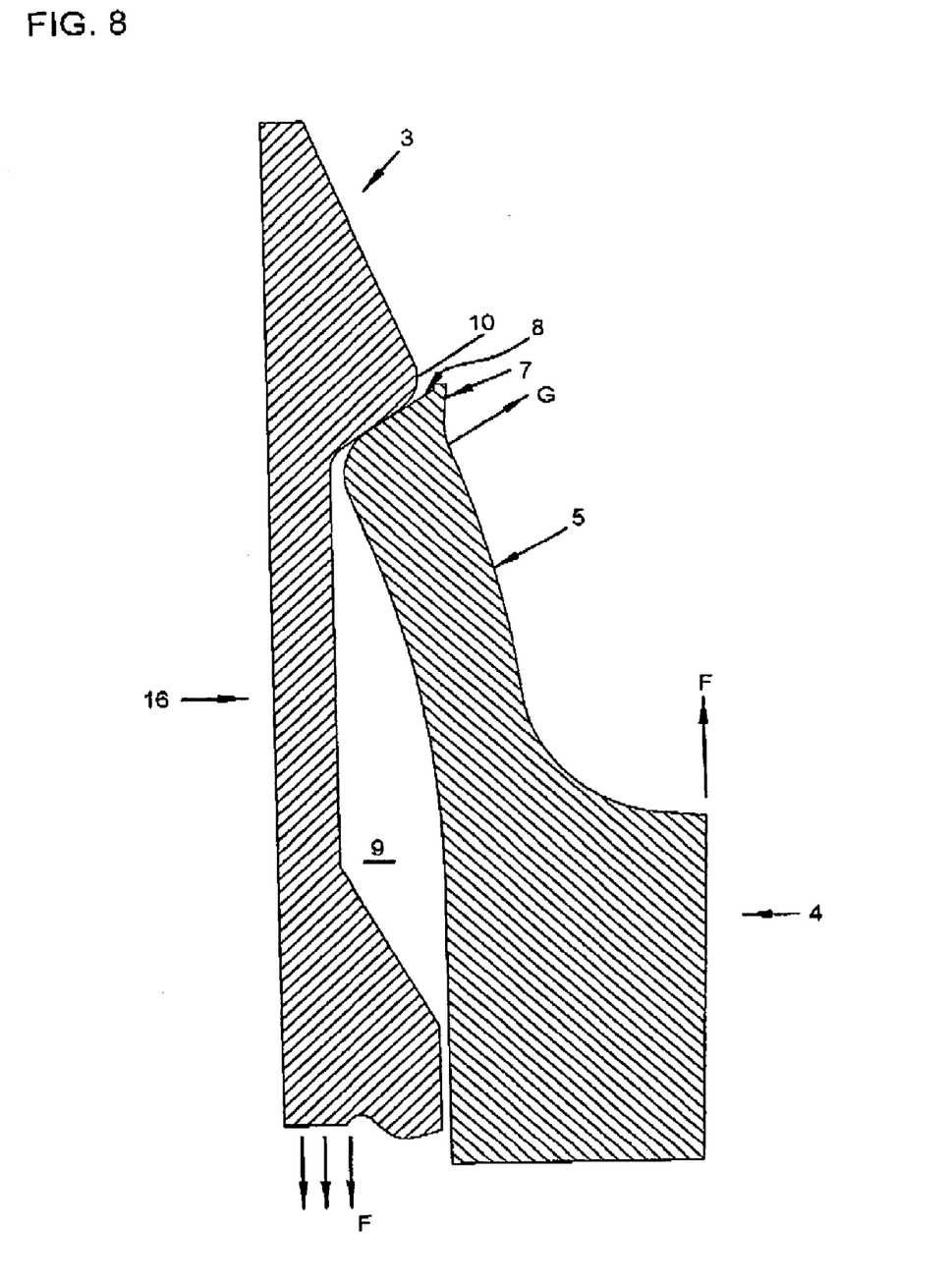
FIG. 8 shows a similar detail as FIG. 7, while a great tensile load F is applied to the first and second retaining elements.

FIG. 8 shows, in detail, the position of the pin head 10 and the resilient lip 5 of the plug 4, while a relatively great load, at least relatively great tensile forces F, are applied to the pin 3 and the plug 4. Such a load is, for instance, a load by which an additional mass is suspended from the rail 1. These forces F overcome a friction force prevailing between the gliding surfaces 6, 8 of the pin 3 and the plug 4 and an inherent resilience of the resilient lips 5, so that each resilient lip 5 gradually swivels in a direction G away from the pin 3. When the load F is equal to or greater than a particular threshold load, each lip 5 swivels outwards to an extent such that the plug passage 9 becomes wide enough to allow the pin head 10 of the pin 3 to pass. In that case, the pin 3 is pulled from the plug passage 9 by the tensile force F, so that the rail 1 is disconnected from the tube 12. Hence, the pendant 12 is not taken along by the rail 1 at a fall of the rail 1 following this detachment.

Figure 9:
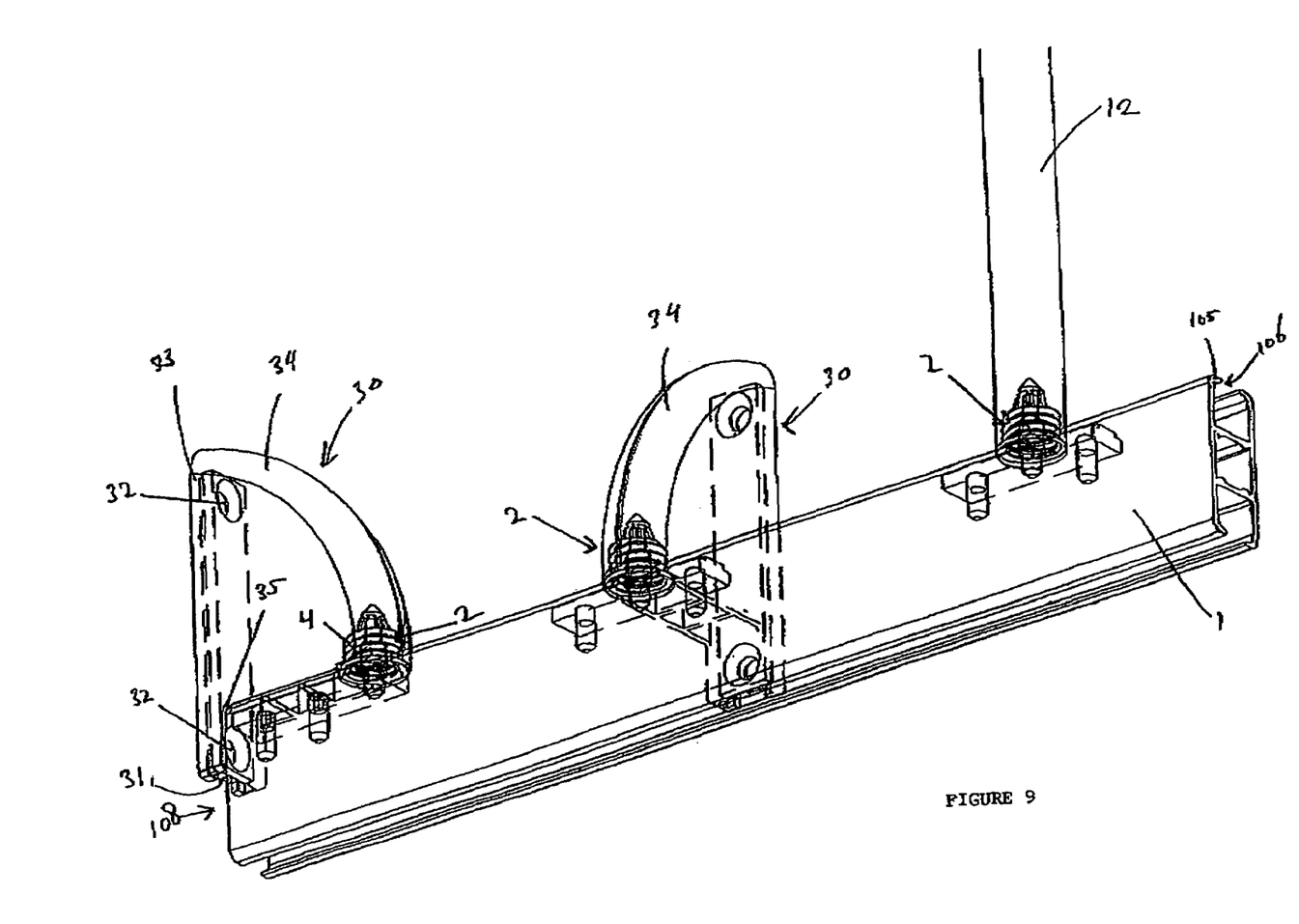
FIG. 9 shows a perspective view of a second exemplary embodiment of the invention.
Figure 10:
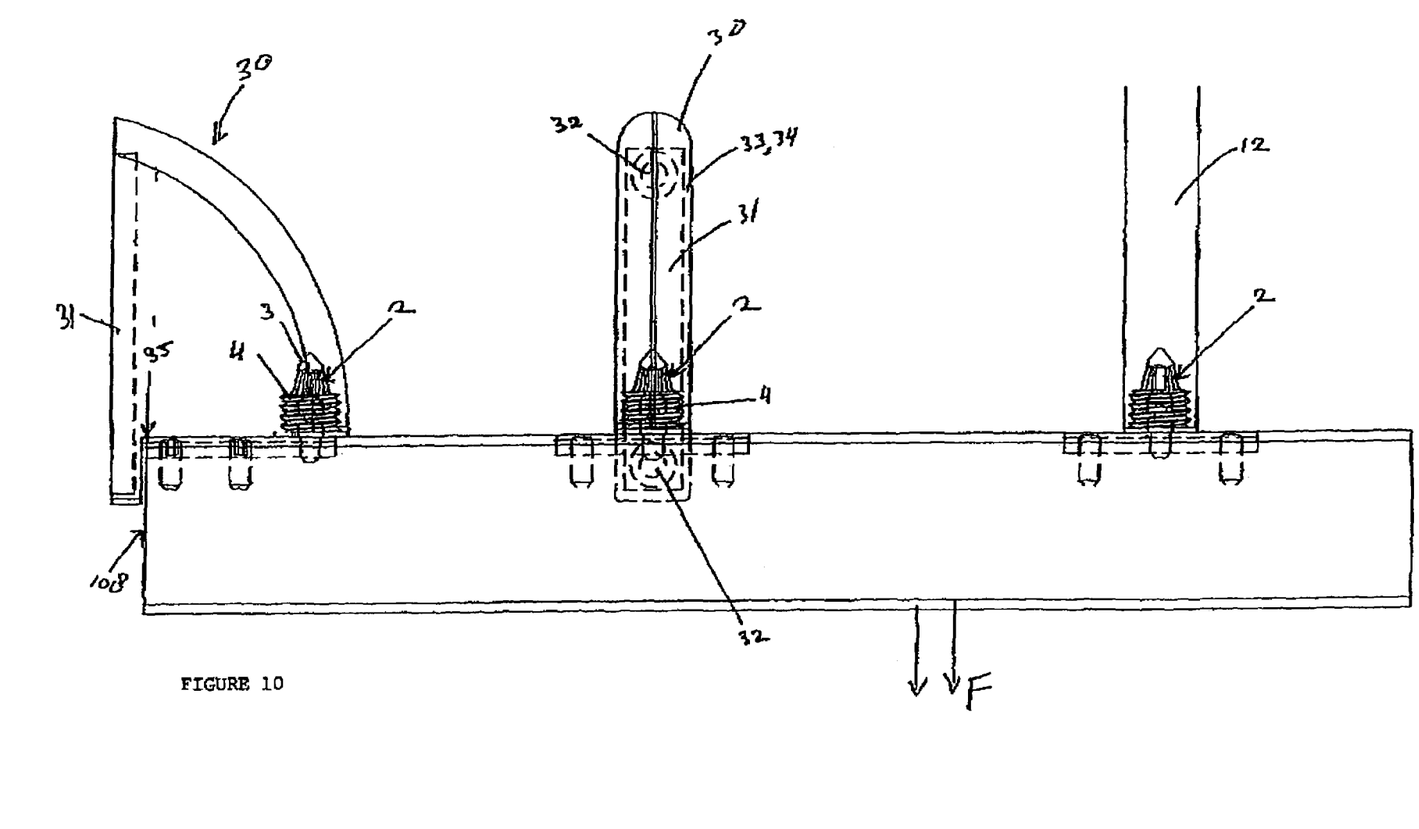
FIG. 10 shows a partly cut-away side view of the second exemplary embodiment represented in FIG. 9.

FIGS. 9 and 10 show a second exemplary embodiment of the invention. The exemplary embodiment is distinguished from the first exemplary embodiment in that the rail 1 is provided with three safety connections 2. Each of these connections 2 comprises such an assembly of a pin 3 and plug 4 as described hereinabove. One of these connections 2 is used for connecting the rail 1 via a pendant 12 to an environment. The other two safety connections 2 are provided in wall-connecting devices 30. These connecting devices 30 each comprise an assembly of a wall plate 31 and, slid onto that plate 31, a coupling element 33, which is provided with a housing 34. The wall plate 31 is provided with passages 32 for attaching the plate 31 to a wall (not represented). At a bottom end, the housing 34 of the coupling element 33 is provided with a bore with internal screw thread in which a plug 4 of the safety connection 2 is provided.

As further shown in these FIGS. 9 and 10, the wall-connecting device 30 represented in the Figure on the left hand side is designed to support the curtain rail 1 at a front end 108. As a result, this connecting device 30 can prevent the rail 1 from hinging about the bottom end of the housing 34 of that connecting device 30 when the safety connections 2 of the rail 1 are uncoupled by a vertical load F. Hinging about the left-hand safety connection 2 is undesired because, consequently, that safety connection 2 could become jammed. Preferably, this support of the end 108 of the rail 1 takes place on at least one side of the curtain rail 1 facing upwards. In the present exemplary embodiment, such support is effected by a supporting edge 35 of the connecting device 30 engaging the upper edge of the rail 1.

It is self-evident that the invention is not limited to the exemplary embodiments described. Various modifications are possible within the framework of the invention as set forth in the following claims.

For instance, the rail 1 can be coupled to an environment via various types of auxiliary means in combination with the safety connection, for instance via tubes, strips, wire material or a combination of these or different coupling elements. Such elements can have various shapes and sizes and be manufactured from different materials, such as metal, wood, plastic or the like. Additionally, a rail can be coupled directly to an environment such as a ceiling and/or a wall with a number of safety connections 2 without utilizing spacing coupling elements.

Further, each first retaining element 3 can be coupled to the rail and the second retaining element 4 to an environment, or vice versa.

Additionally, each resilient lip 5 of the second retaining element 4 can have various sizes and shapes and extend in several directions to effect the desired coupling between the retaining elements 3, 4. For instance, the resilient lip 5 can extend entirely or partly in a substantially horizontal direction, at least after mounting. However, as stated, the use of substantially vertically extending resilient lips is advantageous so as to be able to provide a relatively slim safety connection which still has a high uncoupling force, for instance 300 N.

Further, the slide-off surface 6 of the first retaining element 3 can extend in various directions and comprise different partial sliding surfaces, for instance a separate partial sliding surface for each resilient lip 5 of the second retaining element 4.

Further, each first and second retaining element can be manufactured from various materials, such as plastic, plastic composites, metals or the like. Each resilient lip of the second retaining element can also consist of different materials, at least material giving the resilient lip its desired resilient function. For instance, the resilient lip can be manufactured from plastic and/or metal.

The invention claimed is:

1. A rail system, comprising:
  a horizontally extending rail suspended from a mounting surface, wherein the rail is configured to suspend a curtain therefrom, the rail including a first groove, and a second groove configured to receive curtain runners attached to said curtain;
  at least one safety connection coupled to the rail, the safety connection comprising:
  at least one first retaining element; and
  at least one second retaining element;
    wherein after mounting the rail to the mounting surface, one of the retaining elements is coupled to the rail in the first groove and the other of the retaining elements is connected to the mounting surface, the first and second retaining elements being detachably connected to each other such that, under influence of a tensile force applied to the retaining elements, the first and second retaining elements disconnect from each other, wherein the second retaining element integrally forms a plurality of circumferentially arranged resilient lips, and wherein the first and second retaining elements are configured to cooperate via the integrally formed resilient lips to effect said detachable coupling of the retaining elements, wherein the first retaining element, after mounting the rail to the mounting surface, extends at least partly through a substantially vertical passage of the second retaining element defined by the resilient lips and wherein the plurality of resilient lips extend obliquely towards each other to form a constriction of said passage of the second retaining element to retain the first retaining element within said passage in a couple position, and wherein the plurality of resilient lips deform radially outward to detach the first retaining element from said passage and the coupled position.

2. The rail system according to claim 1, wherein, after mounting, the rail to the mounting surface, each resilient lip extends, on average, in a direction including an angle ($\gamma$) with a vertical plane in the range of approximately 10-45°.

3. The rail system according to claim 2, wherein each resilient lip, after mounting the rail to the mounting surface, extends, on average, in a direction including an angle ($\gamma$) with a vertical plane in the range of approximately 15°-30°.

4. The rail system according to claim 1, wherein the resilient lips are manufactured from plastic.

5. The rail system according to claim 1, wherein a front end of each of the resilient lips of the second retaining element touches a slide-off surface of the first retaining element.

6. The rail system according to claim 5, wherein each said front lip end comprises a sliding surface which is substantially parallel to at least part of said slide-off surface of the first retaining element.

7. The rail system according to claim 5, wherein said slide-off surface of the first retaining element after mounting the rail to the mounting surface, viewed in vertical cross section, includes an angle ($\alpha$) with a vertical plane in the range of 45°-70°.

8. The rail system according to claim 7, wherein the angle ($\alpha$) is in the range of 60°-70°.

9. The rail system according to claim 5, wherein a widened head of the first retaining element is provided with said slide-off surface.

10. The rail system according to claim 1, wherein the first retaining element is provided with a widened head located, after mounting the rail to the mounting surface, above said passage, which head touches the front end of each resilient lip of the second retaining element.

11. The rail system according to claim 1, wherein the first and second retaining elements are each of rotation-symmetrical design relative to an axis of symmetry, which is vertical, at least after mounting the rail to the mounting surface.

12. The rail system according to claim 1, wherein the other retaining element connected to the mounting surface is mounted in a tube or pendant having an inside diameter of less than 2 cm.

13. The rail system according to claim 12, wherein said tube or pendant has a diameter in the range of 10-15 mm.

14. The rail system according to claim 1, wherein each integrally formed resilient lip comprises a radially outward extending resilient lip.

15. The rail system according to claim 14, wherein the second retaining element comprises a monolithic element defining the resilient lips.

16. The rail system according to claim 1, wherein the second retaining element comprises a monolithic element defining the resilient lips.

17. The rail system according to claim 1, wherein each resilient lip extends longitudinally beyond the first retaining element and radially inward.

18. The rail system according to claim 1, wherein the retaining element coupled to the mounting surface is fixedly coupled to the mounting surface.

* * * * *